US008330754B2

(12) United States Patent
Byun et al.

(10) Patent No.: US 8,330,754 B2
(45) Date of Patent: Dec. 11, 2012

(54) ORGANIC LIGHT EMITTING DIODE DISPLAY AND DRIVING METHOD THEREOF

(75) Inventors: Seungchan Byun, Incheon (KR); Jongmoo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 535 days.

(21) Appl. No.: 12/645,135

(22) Filed: Dec. 22, 2009

(65) Prior Publication Data

US 2010/0253664 A1 Oct. 7, 2010

(30) Foreign Application Priority Data

Feb. 20, 2009 (KR) ........................ 10-2009-0014204

(51) Int. Cl.
*G06F 3/038* (2006.01)

(52) U.S. Cl. ............... 345/211; 345/77; 345/82; 345/39

(58) Field of Classification Search ........................ None
See application file for complete search history.

(56) References Cited

U.S. PATENT DOCUMENTS 7,755,578 B2 * 7/2010 Park et al. ........................ 345/76
8,139,002 B2 * 3/2012 Kim et al. ........................ 345/77
2008/0018569 A1 * 1/2008 Sung et al. ........................ 345/82

* cited by examiner

*Primary Examiner* — Muhammad N Edun
(74) *Attorney, Agent, or Firm* — Morgan, Lewis & Bockius LLP

(57) ABSTRACT

An organic light emitting diode display including a display panel having a plurality of data lines, a plurality of gate lines, and a plurality of pixels, a data drive circuit that converts input digital video data into data voltage with reference to gamma reference voltages and supplies the data voltage to the data lines, a gamma reference voltage generation circuit that generates the gamma reference voltages by dividing a high potential gamma power; and a gamma power adjusting circuit that adjusts display luminance by extracting a number of white pixels from the input digital video data and adjusting the output level of the high potential gamma power depending on the number of white pixels.

22 Claims, 9 Drawing Sheets before use of peak luminance after use of peak luminance

ORGANIC LIGHT EMITTING DIODE DISPLAY AND DRIVING METHOD THEREOF

This application claims the benefit of Korean Patent Application No. 10-2009-0014204 filed on Feb. 20, 2009, which is incorporated herein by reference.

BACKGROUND OF THE INVENTION

1. Field of the Invention

This document relates to an organic light emitting diode display, and more particularly, to an organic light emitting diode display that adjusts the luminance of an output image depending on brightness of an input image, and a driving method thereof.

2. Discussion of the Related Art

Recently, various flat panel displays have been developed with lower weight compared with smaller than cathode ray tubes (CRTs). Flat panel displays include, for example, liquid crystal displays (LCDs), field emission displays (FEDs), plasma display panels (PDPs), and electroluminescence devices.

Because the structure and manufacturing process of the PDP are simple, the PDP is spotlighted as a lightweight, thin, and small display and that is advantageous for use in large screen display applications. However, the PDP has low light emitting efficiency, low luminance and large power consumption. A thin film transistor LCD, in which a thin film transistor (hereinafter, "TFT") is used as a switching device, is one of the most widely used flat panel displays. However, because the TFT LCD is a non-emitting device, the TFT LCD has a narrow viewing angle and low response speed. By contrast, electroluminescence devices are classified into inorganic light emitting diode displays and organic light emitting diode displays in accordance with material of an emission layer. In particular, the organic light emitting diode display has high speed, high light emitting efficiency, high brightness, and wide viewing angle by using a self-emitting device.

The organic light emitting diode display has an organic light emitting diode OLED as shown in FIG. 1. The organic light emitting diode includes an anode electrode, a cathode electrode, and organic compound layers that include the hole injection layer HIL, hole transport layer HTL, emission layer EML, electron transport layer ETL, electron injection layer EIL formed between the anode electrode and the cathode electrode.

When a driving voltage is applied to the anode electrode and the cathode electrode, holes passing through the hole transport layer HTL and electrons passing through the electron transport layer ETL move to the emission layer EML to form excitons. As a result, the emission layer EML generates visible light.

The organic light emitting diode display includes a plurality of subpixels arranged in a matrix, each subpixel including the organic light emitting diode. The organic light emitting diode display selects the subpixels by selectively turning on the TFTs, which are active elements, by a scan pulse, and controls the brightness of the selected subpixels in accordance with the gray scale of digital video data.

Such an organic light emitting diode display is susceptible to temperature. A larger display load results in a higher temperature, which affects the driving of the organic light emitting diode display. Temperature is an important factor in determining the life span and display quality of the organic light emitting diode OLED. Generally, the display load becomes much larger when displaying a bright image, rather than when displaying a dark image.

In the related art, there has recently been proposed a method in which the brightness of an input image is analyzed to produce peak luminance in the presence of an only partly bright image and to reduce luminance in the presence of an entirely bright image, thereby minimizing the load applied onto the organic light emitting diode OLED. The peak luminance makes white on a dark screen more distinct, and further improves picture quality. However, the proposed method has at least the following problems.

Firstly, in a related art, to determine the brightness of an input image, input digital video data is analyzed to extract maximum gray level value for each pixel, and then the extracted maximum gray level values are divided by a resolution to calculate an average gray level value in a corresponding frame. As a result, there is a limitation in reducing the size of the circuit logic because a division operation for dividing the maximum gray level values by a resolution is necessarily accompanied in the related art to calculate the average gray level value.

Secondly, in the related art, it is difficult to accurately reflect a situation of an image in luminance adjustment because the brightness of an input image is determined by using an average gray level value. For example, if the average gray level value is '127', the gray level values of all pixels may be '127', or otherwise half of them may be white gray levels and the other half may be black gray levels like a chess pattern. With the average gray level value taken as a reference, both of the two patterns go through the same processing, so there is a limitation in improving the picture quality of, especially, complex images.

SUMMARY OF THE INVENTION

Accordingly, the present invention is directed to a organic light emitting diode display and driving method thereof that substantially obviates one or more problems due to limitations and disadvantages of the related art.

An object of the present invention is to provide an organic light emitting diode display with a simplified circuit logic for determining brightness of an input image when adjusting luminance of an output image so as to correspond to brightness of the input image.

Another object of the present invention is to provide an organic light emitting diode display that accurately reflects the input image in the adjustment of display luminance to improve picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the organic light emitting diode display and driving method thereof includes an organic light emitting diode display including a display panel having a plurality of data lines, a plurality of gate lines, and a plurality of pixels, a data drive circuit that converts input digital video data into data voltage with reference to gamma reference voltages and supplies the data voltage to the data lines, a gamma reference voltage generation circuit that generates the gamma reference voltages by dividing a high potential gamma power; and a gamma power adjusting circuit that adjusts display luminance by extracting a number of white pixels from the input digital video data and adjusting the output level of the high potential gamma power depending on the number of white pixels.

In another aspect, the organic light emitting diode display and driving method thereof includes an organic light emitting diode display including a display panel having a plurality of data lines, a plurality of gate lines, and a plurality of pixels, a data drive circuit that converts input digital video data into data voltage with reference to gamma reference voltages and supplies the data voltage to the data lines, a data adjusting circuit that adjusts the display luminance by extracting a number of white pixels from the input digital video data and modulating the input digital video data depending on the number of extracted white pixels, and a timing controller that rearranges the modulated digital video data and supplies it to the data drive circuit.

In another aspect, the organic light emitting diode display and driving method thereof includes a driving method of an organic light emitting diode display, the organic light emitting diode display including a display panel having a plurality of data lines, a plurality of gate lines, and a plurality of pixels, the method comprising the steps of converting, at a data drive circuit, input digital video data into data voltage with reference to gamma reference voltages and supplying the data voltage to the data lines generating, at a gamma reference voltage generation circuit, gamma reference voltages by dividing a high potential gamma power, and adjusting, at a gamma power adjusting circuit, display luminance by extracting a number of white pixels from the input digital video data and adjusting the output level of the high potential gamma power depending on the number of white pixels.

In another aspect, the organic light emitting diode display and driving method thereof includes a driving method of an organic light emitting diode display, the organic light emitting diode display including a display panel having a plurality of data lines, a plurality of gate lines, and a plurality of pixels, the method comprising the steps of a display panel having a plurality of data lines, a plurality of gate lines, and a plurality of pixels, converting, at a data drive circuit, input digital video data into data voltage with reference to gamma reference voltages and supplies the data voltage to the data lines, adjusting, at a data adjusting circuit, the display luminance by extracting a number of white pixels from the input digital video data and modulating the input digital video data depending on the number of extracted white pixels, and rearranging, at a timing controller, the modulated digital video data and supplying it to the data drive circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings. Wherever possible, like reference numbers will be used for like elements.

Figure 1:
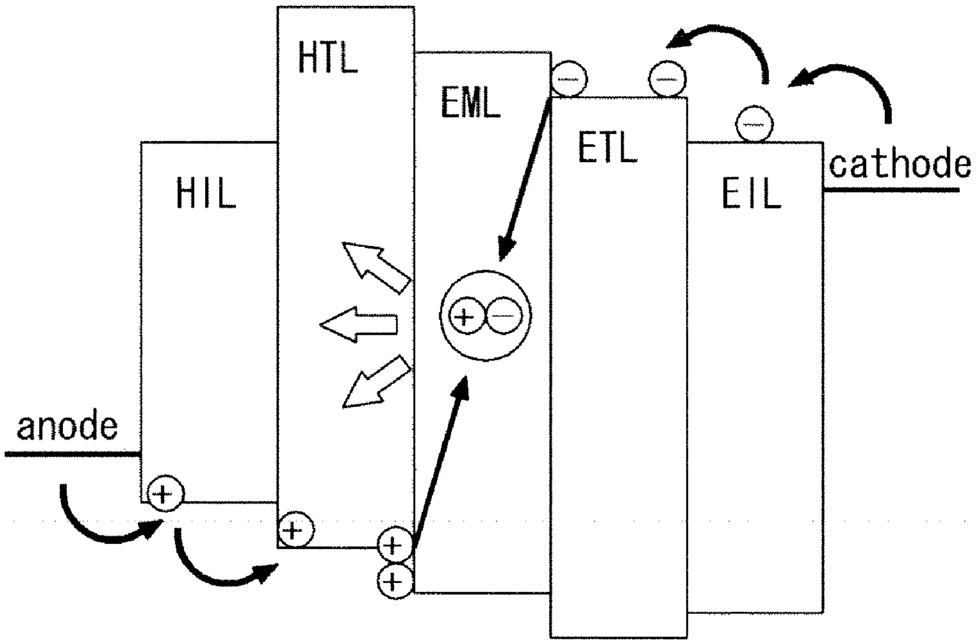
FIG. 1 RELATED ART
FIG. 1 is a diagram illustrating the operational principles of light emission in a organic light emitting diode display according to the related art.
Figure 2:
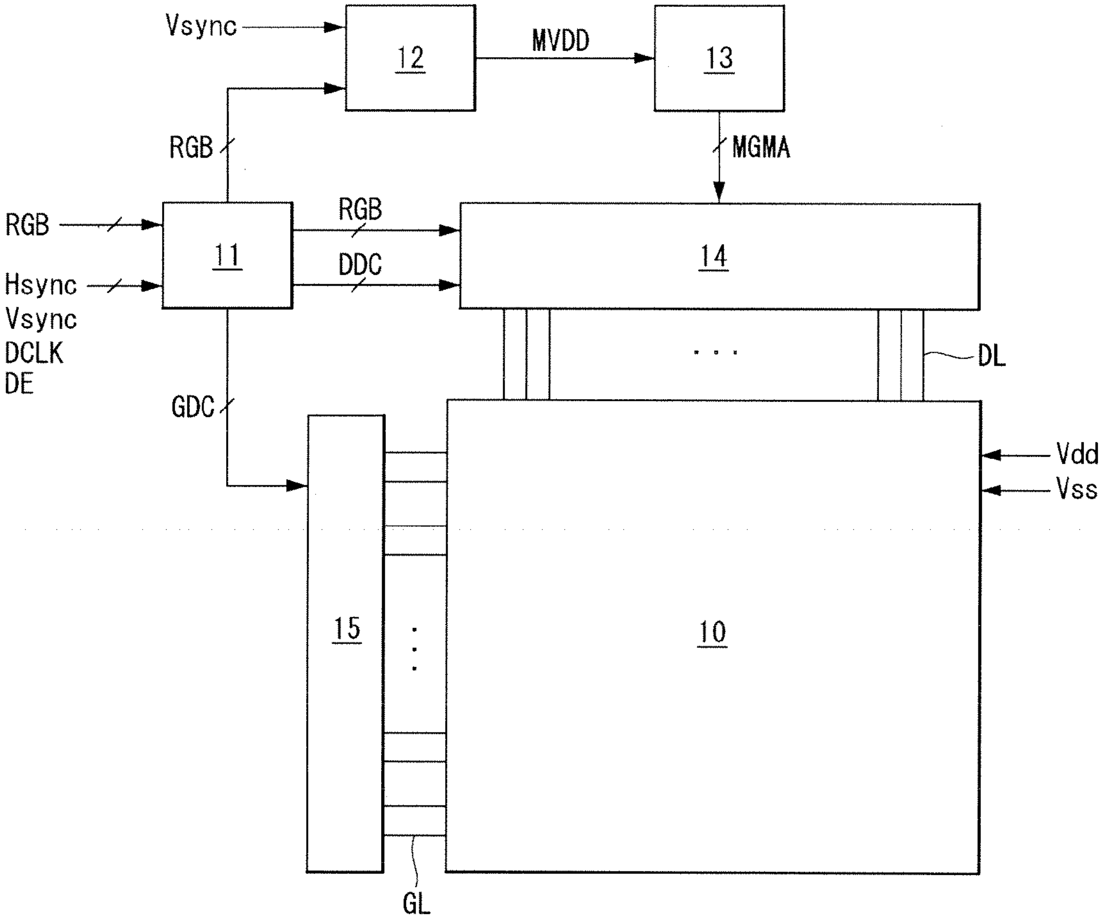
FIG. 2 is a block diagram showing an exemplary organic light emitting diode display according to a first embodiment of the invention.

FIG. 2 is a block diagram showing an exemplary organic light emitting diode display according to a first embodiment of the invention.

As shown in FIG. 2, the exemplary organic light emitting diode display according to the first embodiment of the invention includes a display panel 10, a timing controller 11, a gamma power adjusting circuit 12, a gamma reference voltage generation circuit 13, a data drive circuit 14, and agate drive circuit 15.

The display panel 10 has a plurality of data lines DL and a plurality of gate lines GL crossing each other and R, G, B subpixels arranged in a matrix at cross areas thereof The R subpixel for supplying R data, the G subpixel for supplying G data, and the B subpixel for supplying B data constitute one unit pixel. The R subpixel includes an R organic light emitting diode OLED, the G subpixel includes a G organic light emitting diode OLED, and the B subpixel includes a B organic light emitting diode OLED. Each of the subpixels is connected to the data lines DL and the gate lines GL to receive a data voltage and a scan pulse. Also, each of the subpixels is connected to a driving voltage supply line to receive a high potential driving voltage Vdd and a low potential driving voltage Vss.

The timing controller 11 rearranges digital video data RGB input from outside according to the resolution of the display panel 10 and supplies it to the data drive circuit 14. The timing controller 11 generates a data control signal DDC for controlling the operation timing of the data drive circuit 14 and a gate control signal GDC for controlling the operation timing of the gate drive circuit 15 based on timing signals such as a vertical synchronization signal Vsync, a horizontal synchronization signal Hsync, a dot clock signal DCLK, and a data enable signal DE.

The gamma power adjusting circuit 12 adjusts the luminance of a display image by extracting a number of white pixels from input digital video data RGB and adjusting the output level of a high potential gamma power MVDD depending on the number of extracted white pixels. The gamma power adjusting circuit 12 will be described later in detail with reference to FIGS. 3 to 6.

The gamma reference voltage generation circuit 13 includes a plurality of resistor strings connected between the high potential gamma power MVDD and a base power to generate a plurality of gamma reference voltages MGMA divided between the high potential voltage and the base voltage. Here, the amplitude of the high potential voltage for determining the amplitude of the highest gamma reference voltage is dependent on the output level of the high potential gamma power MVDD so that the amplitude of the gamma reference voltages MGMA varies according to the output level of the high potential gamma power MVDD.

The data drive circuit 14 converts the input digital video data RGB into a gamma compensation voltage with reference to the gamma reference voltages MGMA under the control of the data control signal DDC. The data drive circuit 14 also supplies this gamma compensation voltage to the data lines DL of the display panel 10.

The gate drive circuit 15 generates a scan pulse which varies between a gate high voltage for turning on the TFTs in the subpixels and a gate low voltage for turning off the TFTs. Then, this scan pulse is supplied to the gate lines GL to sequentially drive the gate lines GL, thereby selecting horizontal lines of the display panel 10 to which the data voltages are supplied.

Figure 3:
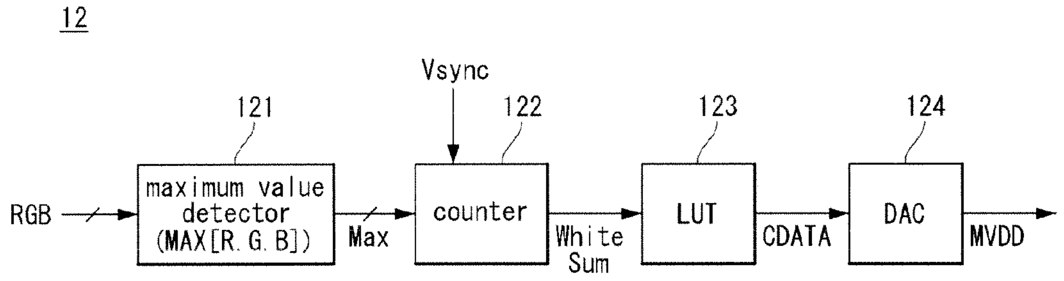
FIG. 3 is a block diagram showing an exemplary gamma power adjusting circuit of FIG. 2.

FIG. 3 is a block diagram showing an exemplary gamma power adjusting circuit 12.

As shown in FIG. 3, the gamma power adjusting circuit 12 includes a maximum value detector 121, a counter 122, a look-up table (hereinafter, "LUT") 123, and a digital-analog converter (hereinafter, "DAC") 124. Here, a number of white pixels is extracted from data having the maximum gray level value of the digital video data RGB for each pixel.

The maximum value detector 121 analyzes the input digital video data RGB to extract maximum data Max[R,G,B] having the maximum gray level value for each pixel.

The counter 122 analyzes and counts the data Max[R,G,B] having the maximum gray level value for each pixel with reference to the vertical synchronization signal Vsync, and detects the cumulative number of pixels (White Sum) for one frame in which a white gray level is displayed. Here, the white gray level is displayed when the maximum data Max[R,G,B] is above a specific gray level value, and may be defined differently according to the consumption current and applications of the organic light emitting diode OLED. For example, if 192 to 255 gray level values of the input digital video data RGB of 8 bits are defined as the white gray level, the counter 122 counts by '+1' when the maximum data Max[R,G,B] to be input is between the 192 gray level value and the 255 gray level value, or otherwise skips the counting operation. Such an operation is performed during one frame, and as a result, the cumulative number of pixels (White Sum) displaying the white gray level in one frame can be easily detected.

The LUT 123 generates a gamma power adjusting data CDATA in order to adjust the adequate luminance of a display screen according to the cumulative number of pixels (White Sum) indicating the white gray level. To this end, the LUT 123 includes a plurality of gamma power adjusting data CDATA that are preset to be mapped to the cumulative number of pixels (White Sum). If the cumulative number of white pixels (White Sum) is large, the LUT 123 outputs a gamma power adjusting data CDATA for decreasing the display luminance through data mapping. On the other hand, if the cumulative number of white pixels (White Sum) is small, the LUT 123 outputs a gamma power adjusting data CDATA for increasing the display luminance through data mapping.

Figure 4:
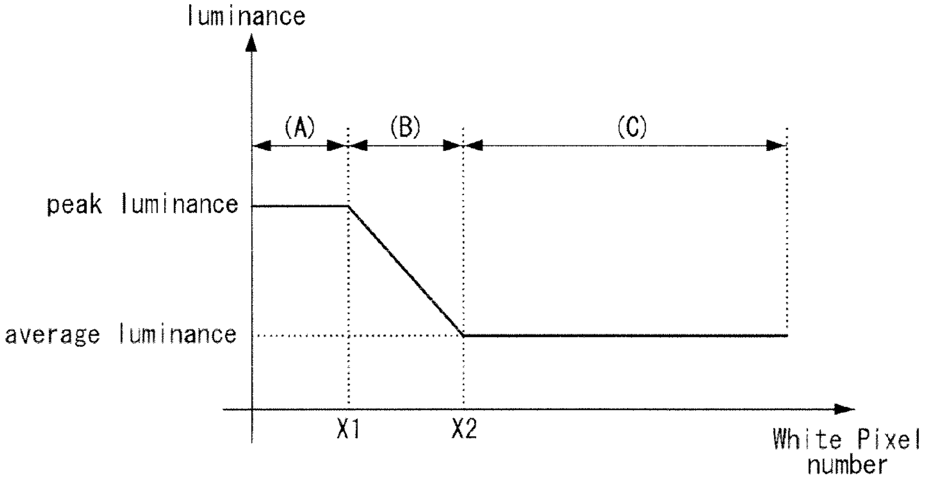
FIG. 4 is a graph showing an exemplary relationship between display luminance and the number of white pixels.

FIG. 4 shows an example of varying display luminance depending on the number of white pixels. For example, as shown in area (A) of FIG. 4, if the cumulative number of white pixels (White Sum) is smaller than 'X1' (corresponding to a dark image), the LUT 123 outputs a gamma power adjusting data CDATA for enabling the display screen to produce peak luminance. On the other hand, as shown in area (C) of FIG. 4, if the cumulative number of white pixels (White Sum) is larger than 'X2' (corresponding to a bright image) (wherein, X2>X1), the LUT 123 outputs a gamma power adjusting data CDATA for enabling the display screen to produce average luminance (wherein average luminance<peak luminance). As shown in area (B) of FIG. 4, if the cumulative number of white pixels (White Sum) is larger than 'X1' and smaller than 'X2' (which corresponds to an image having an intermediate brightness), the LUT 123 outputs a gamma power adjusting data CDATA for making the luminance of the display screen become darker in proportion to the cumulative number of white pixels (White Sum) between the peak luminance and the average luminance.

The levels of the peak luminance and the average luminance may be varied depending on the 'On Current' capability or the like of the TFTs. Also, the values of 'X1' and 'X2' may be adjusted according to user settings. As an example, 'X1' may be set to a value equivalent to when the cumulative number of white pixels (White Sum) is 10% of the total number of pixels, and 'X2' may be set to a value equivalent to when the cumulative number of white pixels (White Sum) is 40% of the total number of pixels.

The DAC 124 converts the digital gamma power adjusting CDATA from the LUT 123 into an analog voltage value, and supplies this analog voltage value as a high potential gamma power MVDD to the gamma reference voltage generation circuit 13.

Figure 5:
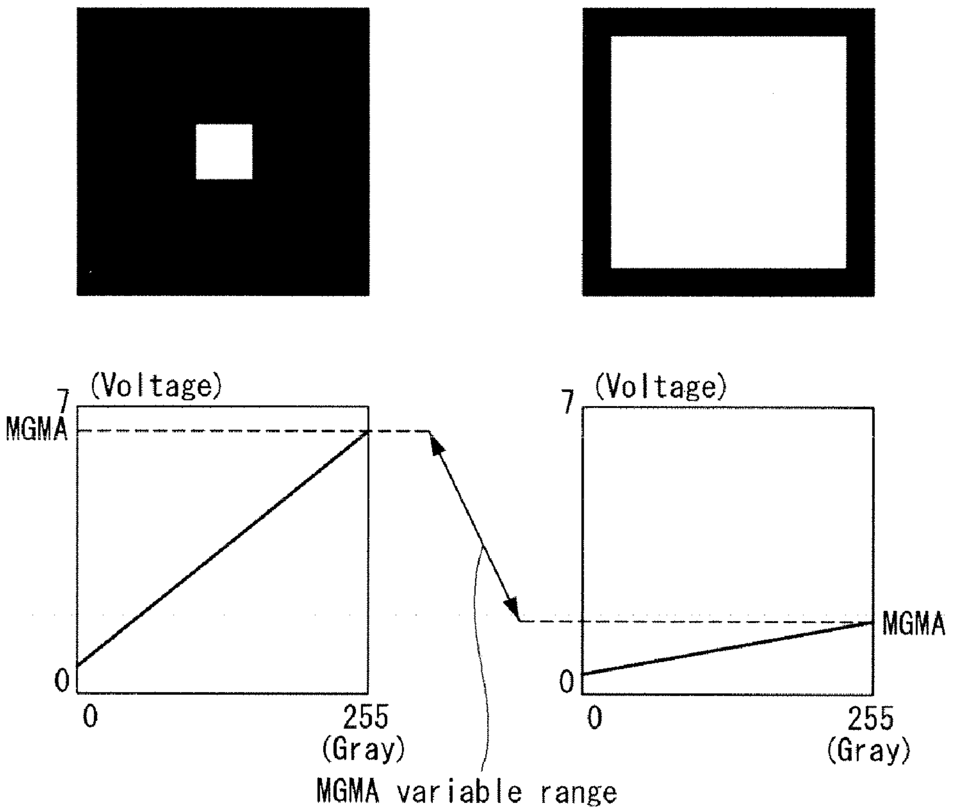
FIG. 5 is a view showing an example of adjusting a gamma reference voltage according to FIG. 4.

FIG. 5 shows an example of adjusting a gamma reference voltage according to FIG. 4. If the high potential gamma power MVDD becomes larger in response to the presence of a partially bright image, the gamma reference voltages MGMA generated through the gamma reference voltage generation circuit 13 become higher overall in proportion to the increase of the high potential gamma power MVDD, as shown in FIG. 5. By contrast, if the high potential gamma power MVDD becomes smaller in response to the presence of an entirely bright image, the gamma reference voltage MGMA generated through the gamma reference voltage generation circuit 13 become lower overall in proportion to the decrease of the high potential gamma power MVDD, as shown in FIG. 5.

Figure 6:
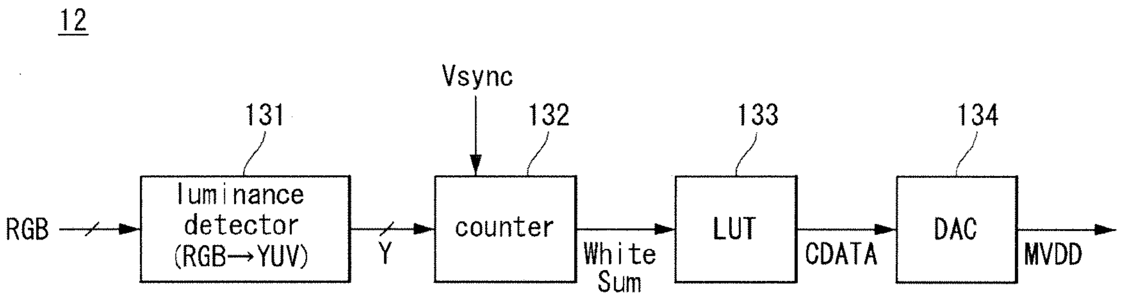
FIG. 6 is a block diagram showing an alternate exemplary gamma power adjusting circuit of FIG. 2.

FIG. 6 is a block diagram showing an exemplary the gamma power adjusting circuit 12.

As shown in FIG. 6, the gamma power adjusting circuit 12 includes a luminance detector 131, a counter 132, an LUT 133, and a DAC 134. As shown in FIG. 6, a number of white pixels is extracted from a luminance value converted from the digital video data RGB for each pixel.

The luminance detector 131 separates digital video data RGB into a luminance component Y and chrominance components U and V. The luminance detector 131 then detects a luminance value Y for each pixel.

The counter 132 analyzes and counts luminance value Y for each pixel with reference to a vertical synchronization signal Vsync, and detects the cumulative number of pixels (White Sum) for one frame in which a white luminance is displayed. Here, the white luminance is displayed when the luminance values Y are above a predetermined value, and may be defined differently according to the consumption current and application of the organic light emitting diode OLED. The counter 132 counts by '+1' when the luminance values Y to be inputted are above the predetermined value, or otherwise skips the counting operation. Such an operation is performed during one frame. As a result, the cumulative number of pixels (White Sum) displaying the white gray level in one frame can be easily detected.

The LUT 133 generates a gamma power adjusting data CDATA to adjust the adequate luminance of a display screen according to the cumulative number of pixels (White Sum) indicating the white luminance. To this end, the LUT 133 includes a plurality of gamma power adjusting data CDATA that are preset to be mapped to the cumulative number of pixels (White Sum). If the cumulative number of white pixels (White Sum) is large, the LUT 133 outputs a gamma power adjusting data CDATA for decreasing the display luminance through data mapping. On the other hand, if the cumulative number of white pixels (White Sum) is small, the LUT 133 outputs a gamma power adjusting data CDATA for increasing the display luminance through data mapping. For example, as shown in area (A) of FIG. 4, if the cumulative number of white pixels (White Sum) is smaller than 'X1' (corresponding to a dark image), the LUT 133 outputs a gamma power adjusting data CDATA for enabling the display screen to produce a peak luminance. On the other hand, as shown in area (C) of FIG. 4, if the cumulative number of white pixels (White Sum) is larger than 'X2' (corresponding to a bright image) (wherein X2>X1), the LUT 133 outputs a gamma power adjusting data CDATA for enabling the display screen to produce an average luminance (wherein average luminance<peak luminance). As shown in area (B) of FIG. 4, if the cumulative number of white pixels (White Sum) is larger than 'X1' and smaller than 'X2' (which corresponds to an image having an intermediate brightness), the LUT 133 outputs a gamma power adjusting data CDATA for making the luminance of the display screen become darker and darker in proportion to the cumulative number of white pixels (White Sum) between the peak luminance and the average luminance.

The levels of the peak luminance and the average luminance may be varied depending on the 'On Current' capability or the like of the TFTs. Also, the values of 'X1' and 'X2' may be adjusted according to user settings. As an example, 'X1' may be set to a value equivalent to when the cumulative number of white pixels (White Sum) is 10% of the total number of pixels, and 'X2' may be set to a value equivalent to when the cumulative number of white pixels (White Sum) is 40% of the total number of pixels.

The DAC 134 converts the digital gamma power adjusting CDATA from the LUT 133 into an analog voltage value, and supplies this analog voltage value as a high potential gamma power MVDD to the gamma reference voltage generation circuit 13. If the high potential gamma power MVDD becomes larger in response to the presence of an only partly bright image, the gamma reference voltages MGMA generated through the gamma reference voltage generation circuit 13 become higher overall, as shown in FIG. 5, in proportion to the increase of the high potential gamma power MVDD. By contrast, if the high potential gamma power MVDD becomes smaller in response to the presence of an entirely bright image, the gamma reference voltages MGMA generated through the gamma reference voltage generation circuit 13 become lower overall, as shown in FIG. 5, in proportion to the decrease of the high potential gamma power MVDD.

The gamma power adjusting circuit 12 according to FIGS. 3 to 6 does not require a division operation for determining the brightness of an input image. Thus, its circuit logic is simplified compared to the related art.

Figure 7:
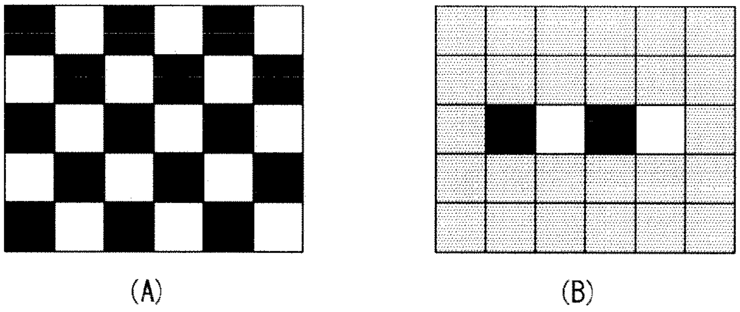
FIG. 7 illustrates two exemplary input images (A) and (B)
Figure 8:
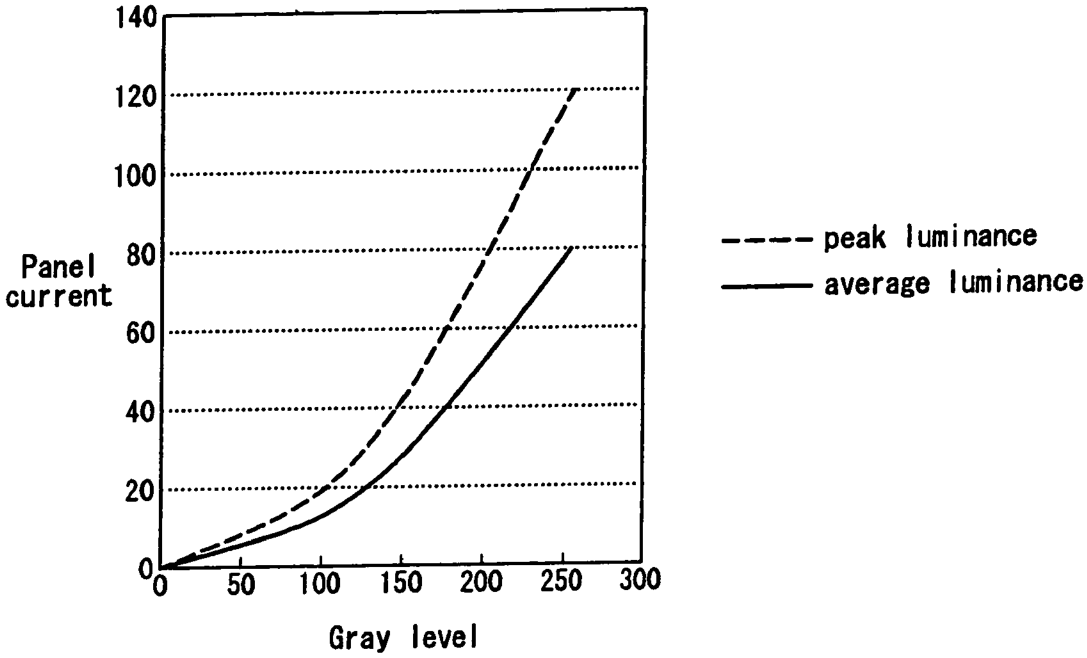
FIG. 8 is a graph comparing the panel current for a panel operating at average luminance to the panel current for a panel operating at peak luminance.
Figure 9:
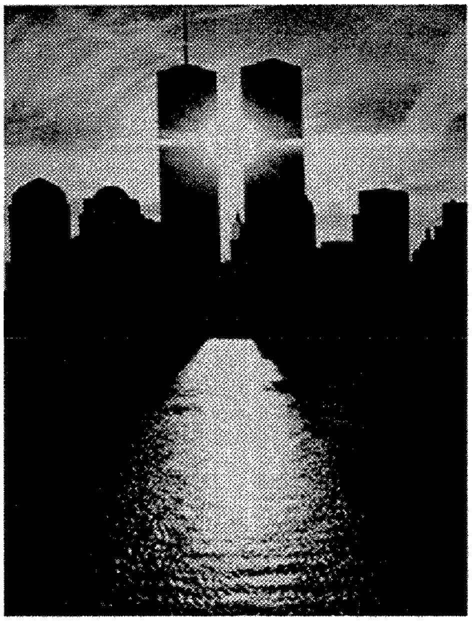
FIG. 9 is illustrates an image before and after use of peak luminance to explain the effects of the invention which enable it to accurately reflect situation of an input image in the adjustment of display luminance.
Figure 9:
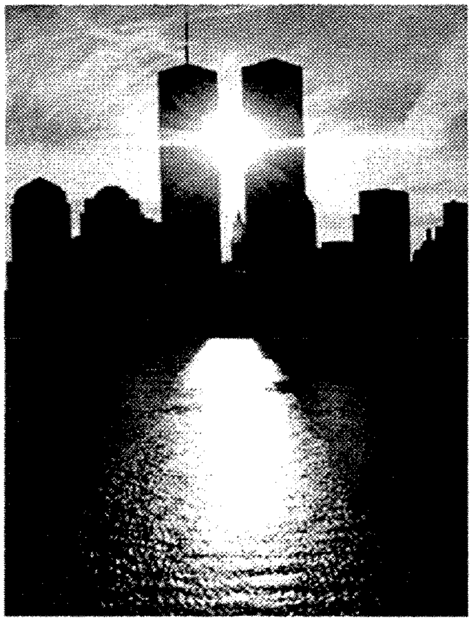

FIGS. 7 to 9 explain the effects of the present invention which enable it to accurately reflect the situation of an input image in the adjustment of display luminance. FIG. 7 illustrates two exemplary input images (A) and (B).

As shown in FIGS. 7 to 9, the operation and effects of the present invention compared to the related art will be described below. In the related art, both of input images (A) and (B) of FIG. 7 are driven in the same manner because the brightness of an input image is determined using an average gray level value. When both (A) and (B) of FIG. 7 are driven at a peak luminance, (A) of FIG. 7 shows a high contrast of a display image, which does not enhance picture quality compared to driving at an average luminance and only results in increased consumption current as shown in FIG. 8. FIG. 8 is a graph comparing the panel current for a panel operating at average luminance to the panel current for a panel operating at peak luminance. When both (A) and (B) of FIG. 7 are driven at an average luminance, it is difficult to improve picture quality of (B) because (B) contains an image with various gray levels on the whole even if the average gray level value of (B) of FIG. 7 is equal to that of (A).

By contrast, in the invention, both (A) and (B) of FIG. 7 may be driven in different manners because the brightness of an input image is determined using the number of white pixels. According to the invention, for (A) in which the number of white pixels is 50% of the total number of pixels, input image (A) can be driven at an average luminance to reduce consumption current. On the other hand, for (B) of FIG. 7 in which the number of white pixels is 10% of the total number of pixels, (B) can be driven at a peak luminance to realize a clearer display image as shown in FIG. 9. FIG. 9 is illustrates an image before and after use of peak luminance to explain the effects of the invention which enable it to accurately reflect situation of an input image in the adjustment of display luminance.

Figure 10:
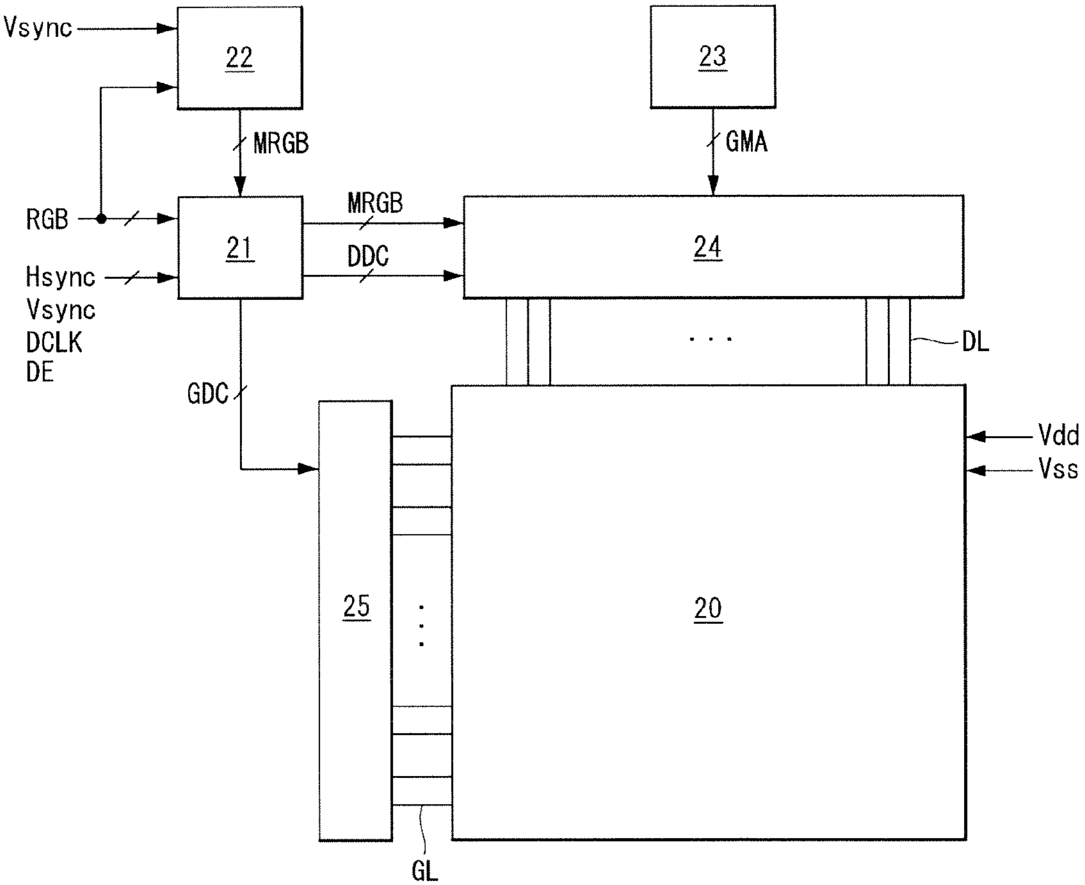
FIG. 10 is a block diagram showing an exemplary organic light emitting diode display according to a second embodiment of the invention.

FIG. 10 is a block diagram showing an exemplary organic light emitting diode display according to a second embodiment of the present invention.

As shown in FIG. 10, the organic light emitting diode display according to the second embodiment of the invention includes a display panel 20, a timing controller 21, a data adjusting circuit 22, a gamma reference voltage generation circuit 23, a data drive circuit 24, and a gate drive circuit 25.

The display panel 20 has a plurality of data lines DL and a plurality of gate lines GL crossing each other and R, G, B subpixels arranged in a matrix at cross areas thereof. The R subpixel for supplying R data, the G subpixel for supplying G data, and the B subpixel for supplying B data constitute one unit pixel. The R subpixel includes an R organic light emitting diode OLED, the G subpixel includes a G organic light emitting diode OLED, and the B subpixel includes a B organic light emitting diode OLED. Each of the subpixels is connected to the data lines DL and the gate lines GL to receive a data voltage and a scan pulse. Also, each of the subpixels is connected to a driving voltage supply line to receive a high potential driving voltage Vdd and a low potential driving voltage Vss.

The timing controller 21 rearranges modulated digital video data MRGB input from the data adjusting circuit 22 according to the resolution of the display panel 20 and supplies it to the data drive circuit 24. The timing controller 21 generates a data control signal DDC for controlling an operation timing of the data drive circuit 24 and a gate control signal GDC for controlling an operation timing of the gate drive circuit 25 based on timing signals such as a vertical synchronization signal Vsync, a horizontal synchronization signal Hsync, a dot clock signal DCLK, and a data enable signal DE.

The data adjusting circuit 22 adjusts the luminance of a display image by extracting number of white pixels from input digital video data RGB and modulating the input digital video data RGB depending on the number of the extracted white pixels. The larger the number of white pixels is, the smaller the value of the modulated digital video data MRGB is compared to the original input digital video data RGB. On the other hand the smaller the number of white pixels is, the larger the value of the modulated digital video data MRGB is compared to the original input digital video data RGB. Such a data adjusting circuit 22 will be described later in detail with reference to FIGS. 11 and 12.

The gamma reference voltage generation circuit 23 includes a plurality of resistor strings connected between a high potential gamma power and a base power to generate a plurality of gamma reference voltages GMA divided between the high potential voltage and the base voltage.

The data drive circuit 24 converts the modulated digital video data MRGB into a gamma compensation voltage with reference to the gamma reference voltages GMA under control of the data control signal DDC, and supplies this gamma compensation voltage to the data lines DL of the display panel 20.

The gate drive circuit 25 generates a scan pulse which is swung between a gate high voltage for turning on the TFTs in the subpixels and a gate low voltage for turning off the TFTs. Then, this scan pulse is supplied to the gate lines GL to sequentially drive the gate lines GL, thereby selecting horizontal lines of the display panel 20 to which the data voltages are supplied.

Figure 11:
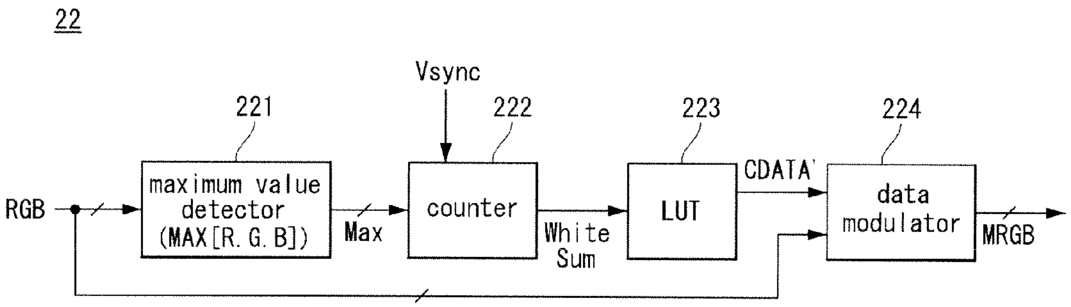
FIG. 11 is a block diagram showing an exemplary data adjusting circuit of FIG. 10.

FIG. 11 is a block diagram showing an exemplary data adjusting circuit 22 of FIG. 10. FIG. 11 shows the use of data having the maximum gray level of the digital video data RGB for each pixel.

As shown in FIG. 11, the data adjusting circuit 22 includes a maximum value detector 221, a counter 222, an LUT 223, and a data modulator 224. The maximum value detector 221 analyzes the input digital video data RGB, and extracts maximum data Max[R,G,B] having the maximum gray level value for each pixel. The counter 222 analyzes and counts the data Max[R,G,B] having the maximum gray level value for each pixel with reference to the vertical synchronization signal Vsync, and detects the cumulative number of pixels (White Sum) for one frame in which a white gray level is displayed. Here, the white gray level is displayed when the maximum data Max[R,G,B] is above a specific gray level value, and may be defined differently according to the consumption current and application of the organic light emitting diode OLED. For example, if 192 to 255 gray level values of the input digital video data RGB of 8 bits are defined as the white gray level, the counter 222 counts by '+1' when the maximum data Max[R,G,B] to be input is between the 192 gray level value and the 255 gray level value, or otherwise skips the counting operation. Such an operation is performed during one frame, and as a result, the cumulative number of pixels (White Sum) displaying the white gray level in one frame can be easily detected.

The LUT 223 generates a modulation control data CDATA' in order to adjust the adequate luminance of a display screen according to the cumulative number of pixels (White Sum) indicating the white gray level. To this end, the LUT 223 includes a plurality of modulation control data CDATA' that are preset to be mapped to the cumulative number of pixels (White Sum). If the cumulative number of white pixels (White Sum) is large, the LUT 223 outputs a modulation control data CDATA' for decreasing the display luminance through data mapping, while if the cumulative number of white pixels (White Sum) is small, the LUT 223 outputs a modulation control data CDATA' for increasing the display luminance through data mapping. For example, as shown in area (A) of FIG. 4, if the cumulative number of white pixels (White Sum) is smaller than 'X1' (corresponding to a dark image), the LUT 223 outputs a modulation control data CDATA' for enabling the display screen to produce a peak luminance, while as shown in area (C) of FIG. 4, if the cumulative number of white pixels (White Sum) is larger than 'X2' (corresponding to a bright image) (wherein X2>X1), the LUT 223 outputs a modulation control data CDATA' for enabling the display screen to produce an average luminance (wherein average luminance<peak luminance). As shown in area (B) of FIG. 4, if the cumulative number of white pixels (White Sum) is larger than 'X1' and smaller than 'X2' (which corresponds to an image having an intermediate brightness), the LUT 223 outputs a modulation control data CDATA' for making the luminance of the display screen become darker and darker in proportion to the cumulative number of white pixels (White Sum) between the peak luminance and the average luminance. The levels of the peak luminance and the average luminance may be varied in consideration of the 'On Current' capability or the like of the TFTs. Also, the values of 'X1' and 'X2' may be adjusted according to user settings. As an example, 'X1' may be set to a value equivalent to when the cumulative number of white pixels (White Sum) is 10% of the total number of pixels, and 'X2' may be set to a value equivalent to when the cumulative number of white pixels (White Sum) is 40% of the total number of pixels.

The data modulator 224 adds the modulation control data CDATA' from the LUT 223 to the original input digital video data RGB, or substracts the modulation control data CDATA' from the original input digital video data RGB to generate modulated digital video data MRGB. Then, the data modulator 224 supplies it to the timing controller 21. The larger the number of white pixels is, the smaller the value of the modulated digital video data MRGB is compared to the original input digital video data RGB, while the smaller the number of white pixels is, the larger the value of the modulated digital video data MRGB is compared to the original input digital video data RGB.

Figure 12:
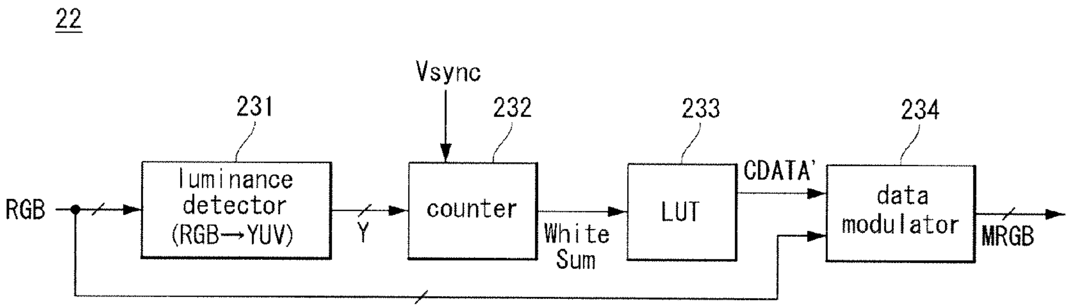
FIG. 12 is a block diagram showing an alternate exemplary data adjusting circuit of FIG. 10.

FIG. 12 is a block diagram showing an alternate exemplary data adjusting circuit of FIG. 10. FIG. 12 shows that the number of white pixels is extracted from a luminance value converted from the digital video data RGB for each pixel.

As shown in FIG. 12, the data adjusting circuit 22 includes a luminance detector 231, a counter 232, an LUT 233, and a data modulator 234.

The luminance detector 231 separates digital video data RGB from the outside into a luminance component Y and chrominance components U and V, and then detects a luminance value Y for each pixel.

The counter 232 analyzes and counts the luminance value Y for each pixel with reference to a vertical synchronization signal Vsync, and detects the cumulative number of pixels (White Sum) for one frame in which a white luminance is displayed. Here, the white luminance is displayed when the luminance values Y are above a predetermined value, and may be defined differently according to the consumption current and application of the organic light emitting diode OLED. The counter 232 counts by '+1' when the luminance values Y to be input are above the predetermined value, or otherwise skips the counting operation. Such an operation is performed during one frame, and as a result, the cumulative number of pixels (White Sum) displaying the white gray level in one frame can be easily detected.

The LUT 233 generates a modulation control data CDATA' in order to adjust the adequate luminance of a display screen according to the cumulative number of pixels (White Sum) indicating the white gray level. To this end, the LUT 233 includes a plurality of modulation control data CDATA' that are preset to be mapped to the cumulative number of pixels (White Sum). If the cumulative number of white pixels (White Sum) is large, the LUT 233 outputs a modulation control data CDATA' for decreasing the display luminance through data mapping, while if the cumulative number of white pixels (White Sum) is small, the LUT 233 outputs a modulation control data CDATA' for increasing the display luminance through data mapping. For example, as shown in area (A) of FIG. 4, if the cumulative number of white pixels (White Sum) is smaller than 'X1' (corresponding to a dark image), the LUT 233 outputs a modulation control data CDATA' for enabling the display screen to produce a peak luminance, while as shown in area (C) of FIG. 4, if the cumulative number of white pixels (White Sum) is larger than 'X2' (corresponding to a bright image) (wherein X2>X1), the LUT 233 outputs a modulation control data CDATA' for enabling the display screen to produce an average luminance (wherein average luminance<peak luminance). As shown in area (B) of FIG. 4, if the cumulative number of white pixels (White Sum) is larger than 'X1' and smaller than 'X2' (which corresponds to an image having an intermediate brightness), the LUT 233 outputs a modulation control data CDATA' for making the luminance of the display screen become darker and darker in proportion to the cumulative number of white pixels (White Sum) between the peak luminance and the average luminance. The levels of the peak luminance and the average luminance may be varied in consideration of the 'On Current' capability or the like of the TFTs. Also, the values of 'X1' and 'X2' may be adjusted according to user settings. As an example, 'X1' may be set to a value equivalent to when the cumulative number of white pixels (White Sum) is 10% of the total number of pixels, and 'X2' may be set to a value equivalent to when the cumulative number of white pixels (White Sum) is 40% of the total number of pixels.

The data modulator 234 adds the modulation control data CDATA' from the LUT 233 to the original input digital video data RGB, or substracts the modulation control data CDATA' from the original input digital video data RGB to generate modulated digital video data MRGB. And then the data modulator 224 supply it to the timing controller 21. The larger the number of white pixels is, the smaller the value of the modulated digital video data MRGB is compared to the original input digital video data RGB, while the smaller the number of white pixels is, the larger the value of the modulated digital video data MRGB is compared to the original input digital video data RGB.

The data adjusting circuit 22 according to FIGS. 11 and 12 does not require a division operation for determining the brightness of an input image, so its circuit logic is simplified a lot compared to the related art. The second embodiment of the invention provides the same operation and effects as described in FIGS. 7 to 9.

As described above, the organic light emitting diode display and the driving method thereof according to the invention can simplify the circuit logic a lot because no division operation is required for determining the brightness of an input image when adjusting the luminance of an output image so as to correspond to the brightness of the input image, and can improve picture quality much without an increase of power consumption by accurately reflecting the situation of the input image in the adjustment of display luminance.

It will be apparent to those skilled in the art that various modifications and variations can be made in the organic light emitting diode display and driving method thereof of the present invention without departing form the spirit or scope of the invention. Thus, it is intended that the present invention cover the modifications and variations of this invention provided they come within the scope of the appended claims and their equivalents.

What is claimed is:

1. An organic light emitting diode display comprising:
- a display panel having a plurality of data lines, a plurality of gate lines, and a plurality of pixels;
- a data drive circuit that converts input digital video data into data voltage with reference to gamma reference voltages and supplies the data voltage to the data lines;
- a gamma reference voltage generation circuit that generates the gamma reference voltages by dividing a high potential gamma power; and
- a gamma power adjusting circuit that adjusts display luminance by extracting a number of white pixels from the input digital video data and adjusting the output level of the high potential gamma power depending on the number of white pixels.

2. The organic light emitting diode display according to claim 1, the gamma power adjusting circuit including a maximum value detector that analyzes the input video data to extract maximum data having a maximum gray level value for each of the plurality of pixels.

3. The organic light emitting diode display according to claim 1, the gamma power adjusting circuit including a luminance detector that separates the input video data into a luminance component and a chrominance component.

4. The organic light emitting diode display according to claim 2 or 3, the gamma power adjusting circuit further including:
- a counter to detect the number of white pixels;
- a look-up table that generates modulation data that adjusts data according to the number of white pixels; and
- a data to analog converter that converts digital gamma power adjusting data into an analog voltage value that is supplied to a gamma reference voltage generation circuit.

5. The organic light emitting diode display according to claim 1, wherein, if the number of white pixels is greater than a predetermined value, the gamma power adjusting circuit decreases the display luminance.

6. The organic light emitting diode display according to claim 1, wherein, if the number of white pixels is less than a predetermined value, the gamma power adjusting circuit increases the display luminance.

7. The organic light emitting diode display according to claim 1, wherein white pixels include pixels having a gray value that is within a predetermined range of gray values.

8. The organic light emitting diode display according to claim 1, wherein if the number of white pixels is less than or equal to 'X1', the gamma power adjusting data is generated as a value for maintaining the display luminance at a peak value, and if the number of pixels is greater than or equal to 'X2', X2 being greater than X1, the gamma power adjusting data is generated as a value for maintaining the display luminance at an average value, and if the number of pixels is between X1 and X2, the gamma power adjusting data is generated for making display luminance darker in proportion to the number of white pixels between the peak luminance and the average luminance.

9. An organic light emitting diode display comprising:

a display panel having a plurality of data lines, a plurality of gate lines, and a plurality of pixels;

a data drive circuit that converts input digital video data into data voltage with reference to gamma reference voltages and supplies the data voltage to the data lines;

a data adjusting circuit that adjusts the display luminance by extracting a number of white pixels from the input digital video data and modulating the input digital video data depending on the number of extracted white pixels; and a timing controller that rearranges the modulated digital video data and supplies it to the data drive circuit.

10. The organic light emitting diode display according to claim 9, the data adjusting circuit including a maximum value detector that analyzes the input video data to extract maximum data having a maximum gray level value for each of the plurality of pixels.

11. The organic light emitting diode display according to claim 9, the data adjusting circuit including a luminance detector that separates input video data into a luminance component and a chrominance component.

12. The organic light emitting diode display according to claim 10 or 11 wherein the data adjusting circuit further includes:

a counter to detect the number of white pixels;

a look-up table that generates modulation data that adjusts data according to the number of white pixels; and a data modulator that adds or subtracts the modulation control data to and from the input digital video data to generate modulated digital video data.

13. The organic light emitting diode display according to claim 9, wherein, if the number of white pixels is greater than a predetermined value, the data adjusting circuit decreases the display luminance.

14. The organic light emitting diode display according to claim 9, wherein, if the number of white pixels is less than a predetermined value, the data adjusting circuit increases the display luminance.

15. The organic light emitting diode display according to claim 9, wherein white pixels include pixels having a gray value that is within a predetermined range of gray values.

16. The organic light emitting diode display according to claim 9, wherein if the number of white pixels is less than or equal to 'X1', the modulation control data is generated as a value for maintaining the display luminance at a peak value, and if the number of pixels is greater than or equal to 'X2', X2 being greater than X1, the modulation control data is generated as a value for maintaining the display luminance at an average value, and if the number of pixels is between X1 and X2, the modulation control data is generated for making display luminance darker in proportion to the number of white pixels between the peak luminance and the average luminance.

17. A driving method of an organic light emitting diode display, the organic light emitting diode display including a display panel having a plurality of data lines, a plurality of gate lines, and a plurality of pixels, the method comprising the steps of:

converting, at a data drive circuit, input digital video data into data voltage with reference to gamma reference voltages and supplying the data voltage to the data lines;

generating, at a gamma reference voltage generation circuit, gamma reference voltages by dividing a high potential gamma power; and adjusting, at a gamma power adjusting circuit, display luminance by extracting a number of white pixels from the input digital video data and adjusting the output level of the high potential gamma power depending on the number of white pixels.

18. The driving method of an organic light emitting diode display according to claim 17 wherein the gamma power adjusting circuit includes a maximum value detector that analyzes the input video data to extract maximum data having a maximum gray level value for each of the plurality of pixels.

19. The driving method of an organic light emitting diode display according to claim 17 wherein the gamma power adjusting circuit includes a luminance detector that separates the input video data into a luminance component and a chrominance component.

20. A driving method of an organic light emitting diode display, the organic light emitting diode display including a display panel having a plurality of data lines, a plurality of gate lines, and a plurality of pixels, the method comprising the steps of: a display panel having a plurality of data lines, a plurality of gate lines, and a plurality of pixels;

converting, at a data drive circuit, input digital video data into data voltage with reference to gamma reference voltages and supplies the data voltage to the data lines;

adjusting, at a data adjusting circuit, the display luminance by extracting a number of white pixels from the input digital video data and modulating the input digital video data depending on the number of extracted white pixels; and rearranging, at a timing controller, the modulated digital video data and supplying it to the data drive circuit.

21. The driving method of an organic light emitting diode display according to claim 20, wherein the data adjusting circuit includes a maximum value detector that analyzes the input video data to extract maximum data having a maximum gray level value for each of the plurality of pixels.

22. The driving method of an organic light emitting diode display according to claim 20, wherein the data adjusting circuit includes a luminance detector that separates input video data into a luminance component and a chrominance component.

* * * * *